United States Patent [19]
Totsuka et al.

[11] Patent Number: 5,708,632
[45] Date of Patent: Jan. 13, 1998

[54] METHODS AND APPARATUS FOR CONTROLLING ACCESS TO A RECORDING DISK

[75] Inventors: Takashi Totsuka, Chiba; Yasunobu Kato; Noboru Oya, both of Kanagawa; Hiroyuki Shioya, Tokyo, all of Japan

[73] Assignee: Sony Corporation, Japan

[21] Appl. No.: 731,861

[22] Filed: Oct. 21, 1996

[30] Foreign Application Priority Data

Oct. 30, 1995 [JP] Japan ................................ 7-282175

[51] Int. Cl.$^6$ ................................................ G11B 7/00
[52] U.S. Cl. ............................................................ 369/32
[58] Field of Search ................................. 369/32, 44.32, 369/50, 44.28, 44.29, 44.27, 54, 58; 360/26

[56] References Cited

U.S. PATENT DOCUMENTS 5,274,507 12/1993 Lee ............................................. 360/39

*Primary Examiner*—Nabil Hindi
*Attorney, Agent, or Firm*—Limbach & Limbach L.L.P.

[57] ABSTRACT

A method and apparatus for controlling the access to a recording disk which determines a skew so that a rotational delay time at an average distance of movement when a head accesses the recording disk is minimized. The methods and apparatus determine the position of a data block on the recording disk based on at least the determined skew, schedules an order of a plurality of input disk access requests so that an amount of movement of the head becomes small at the time of access with respect to the recording disk by the head, and the head accesses the recording disk based on the result of the scheduling.

33 Claims, 10 Drawing Sheets

| BLOCK# | START PHYSICAL ADDRESS (cyl./Media/sec.) | START SCSI LOGICAL SECTOR | TOTAL NUMBER OF SECTOR |
|---|---|---|---|
| 0 | (1/0/0) | 12 | 19 |
| 1 | (2/0/8) | 32 | 19 |
| 2 | (4/0/4) | 52 | 19 |
| 3 | (6/0/0) | 72 | 19 |
| 4 | (7/0/8) | 92 | 19 |
| 5 | (9/0/4) | 112 | 19 |

FIG. 9
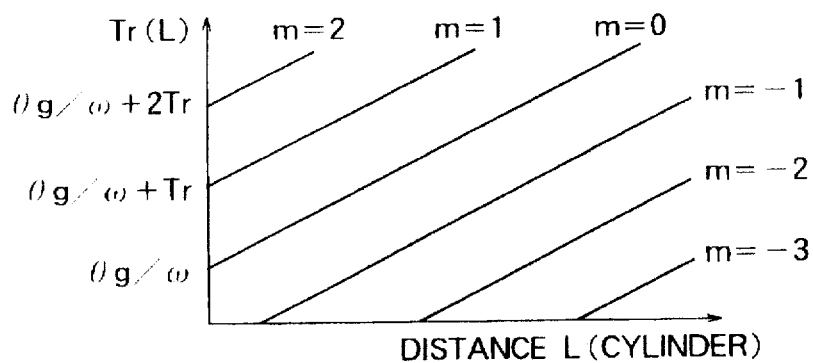
FIG. 10
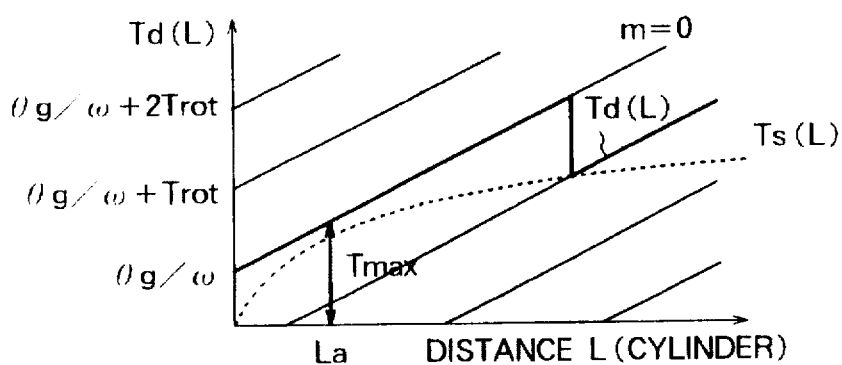
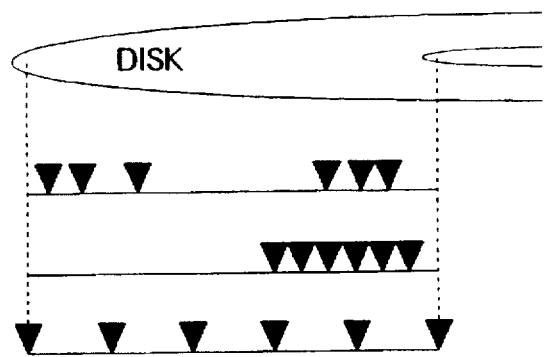
FIG. 11A
FIG. 11B
FIG. 11C

FIG. 16

| BLOCK# | START PHYSICAL ADDRESS (cyl./Media/sec.) | START SCSI: LOGICAL SECTOR | TOTAL NUMBER OF SECTORS | F/B |
|---|---|---|---|---|
| 0 | (0/0/0) | 0 | 40 | F |
| 1 | (0/2/8) | 40 | 40 | F |
| 2 | (0/5/0) | 80 | 40 | F |
| 3 | (1/0/8) | 120 | 40 | F |
| 4 | (1/3/0) | 160 | 40 | F |
| 5 | (4/2/0) | 480 | 40 | F |
| 6 | (4/4/8) | 520 | 40 | F |
| 5013 | (2/0/0) | 224 | 40 | B |
| 5014 | (2/2/8) | 264 | 40 | B |
| 5015 | (2/5/0) | 304 | 40 | B |
| 5016 | (3/0/8) | 344 | 40 | B |
| 5017 | (3/3/0) | 384 | 40 | B |

METHODS AND APPARATUS FOR CONTROLLING ACCESS TO A RECORDING DISK

BACKGROUND OF THE INVENTION

1. Field of the Invention

The present invention relates to a method of controlling the access to a recording disk requiring a high transfer speed and access to discontinuous positions on the disk (random access) and to an apparatus for the same.

2. Description of the Related Art

Along with the increase of the speed of computers, disk storage devices which enable high speed, random access have been becoming increasingly important. In recent years, particularly in technology for multimedia, now the focus of so much attention, it is essential to access the motion pictures and audio stored on the disk as digital data at a high speed and from positions on the disk separate from each other. Namely, a high transfer speed and real time property are required for the storage of multimedia data such as motion pictures and audio. The high transfer speed naturally becomes necessary when handling a large amount of motion pictures and audio.

Furthermore, the real time property requires that an upper limit of the processing time not be exceeded. For example, the movement becomes awkward unless 30 frames are successively displayed per second at constant intervals in the motion picture.

Further, if not able to keep up with the capabilities of the disk and there is insufficient audio data, the sound breaks off and unpleasant noise is generated. In this way, if the data of multimedia are not prepared and used at their respectively specified times, the value of the information drops sharply. Accordingly, in the storage for multimedia, it is important that the upper limit be guaranteed, that is, that the processing can be carried out in that time even in the worst case. Otherwise, even if satisfying the specifications in terms of the average performance, it is possible that the data will be too late at some periods of time. The guarantee of the maximum value of the processing time is referred to as the real time property and is an indispensable function in the multimedia field.

In the storage of information for computers, improvement of average performance has been the primary target. The worst value was not always kept low; that is, there was a large variation in storage processing time. This point stands in sharp contrast to storage requirements for multimedia.

In addition, in the main fields of application of multimedia, successive access to data at physically separated positions (random access) must be able to be carried out at a high speed. For example, video-on-demand (VOD) is a system allowing a large number of viewers to call up and view the programs they like at the times they like. In order to realize this, it is necessary to process the requests from many viewers in parallel and quickly prepare the data of the parts that the viewers are currently watching. For this reason, it becomes necessary to trace the sources of movies, etc. stored at a variety of locations on the disk at a high speed.

Further, in recent years, videos and movies have been edited by using not tapes and films, but disks. With a tape, when inserting a scene of a few seconds into a position near the start of a program of, for example, one hour, to prevent overwriting it is necessary to shift to the rear all of the video after that insertion position and therefore re-record the program. Unlike high speed reproduction of analog audio cassette tapes, such re-recording of video programs requires about one program's worth of time, so the efficiency is poor. With a disk, however, since random access is possible, it is possible to place the insertion portion at another position on the disk, jump once to that position and access the inserted video at the time of reproduction, and then return to the original position and continue the reproduction of the video. Taking this methodology a step further, there is known a technique wherein each scene (cut) of the program is placed at different positions on the disk and track them at a high speed at the time of reproduction so as to make it appear as if a single tape were being reproduced. By doing this, it is possible to switch scenes and change lengths just by changing the order of tracking of the data on the disk, therefore the efficiency of editing is extremely high. This is referred to as non-linear editing. Note that, in this case as well, it is necessary to track physically separated positions on the disk at a high speed.

As seen in these examples, in the fields of application of multimedia, it is extremely important to access the data at a high speed while tracking discontinuous positions on the disk (this is referred to as random access), but the time for the movement of the head to the desired cylinder, which is referred to as the seek time, and the time for waiting for the disk to rotate until the start of the data appears in the cylinder, which is referred to as the rotational delay time, are necessary for movement to discontinuous positions. These times are referred to as the overhead of the access. The longer this is compared with the time for actually accessing the data, the longer time it takes for the transfer of data from the disk and therefore the lower the performance.

Now, when assuming that the seek time of the disk is Ts and the rotational delay time is Tr, the overhead of the disk access becomes Ts+Tr. When the head of the disk exists in the data and the time for actually accessing the data is Tt, the efficiency compared with a case where there is no jump of the head to a separate position becomes low as shown in the following Equation (1):

$$Tt/(Tt+Ts+Tr) \qquad (1)$$

Namely, in comparison with a case where the data on the disk are sequentially accessed from start to the end, in the case where random access is carried out while tracking the data at separated positions, it is necessary to be aware of the reduction of the performances by that amount. Accordingly, the task with multimedia disks is to suppress the reduction in the performance at the time of a random access while maintaining the real time property (to determine the upper limit of the processing time and guarantee to always operate at a time equal to or shorter than this upper limit).

In recent years, research has been conducted regarding the method of guaranteeing the real time property in the access of disks. For example, in D. Anderson, Y. Osawa, and R. Govindan, "A File System for Continuous Media", ACM Transactions on Computer Systems, Vol. 10, No. 4, pp. 311–337, 1992 (hereinafter referred to as "Anderson 92"), an attempt is made to improve the performance of a system by optimizing the relationship between the amount of the buffer memory for temporarily storing the data read from the disk and the amount of the data to be read in a single access.

When it comes to the overhead of the access of the disk, however, to facilitate the analysis, it assumes that the worst values conceivable both for the seek time and the rotational delay time occur at every random access. Namely, the time when seeking from the innermost circumference to the outermost circumference is adopted as the seek time and the time for waiting for exactly one rotation is adopted as the rotational delay time. Of course, if making this assumption, the estimate of the worst value of the processing time is extremely safe, but such an operation is not conducted every time in actuality and therefore the estimate of the worst value becomes very low in comparison with the performance which can be derived from the disk in actuality and such an estimate has little significance as design data.

Further, in V. Rangan and H. Vin, "Efficient Storage Technique for Digital Continuous Multimedia", IEEE Transactions on Knowledge and Data Engineering, Vol. 5, No. 4, pp. 564–573, 1993 (hereinafter referred to as "Rangan 93"), it is investigated how, when cutting a video file into a plurality of segments and storing the different segments at different positions, to determine the lengths of the segments and the intervals between segments so as to maintain the real time property.

Here too, however, when jumping between segments (at time of random access), it is assumed that the worst overhead is caused every time in the same way as described in "Anderson 92", therefore a similar problem exists.

There have also been attempts to keep the worst value lower in comparison with these studies. These enable real time random access to be guaranteed with much higher performances. Each of N. Reddy and J. Wyllie, "Disk Scheduling in a Multimedia I/O System", ACM multimedia 93, pp. 225–233, 1993 (hereinafter referred to as "Reddy 93"), J. Gemmel, J. Han, et al., "Delay-Sensitive Multimedia on Disk", IEEE Multimedia 1994, pp. 56–67, 1994 (hereinafter referred to as "Gemmel 94"), and M. Chen, D. Kandlur, and P. Yu, "Optimization of the Grouped Sweeping Scheduling (GSS) with Heterogeneous Multimedia Streams", ACM Multimedia 93, pp. 235–242, 1993 (hereinafter referred to as "Chen 93"), attempts to suppress the overhead by using a head scheduling algorithm referred to as "SCAN".

"Head scheduling" is a method for reducing the seek time by tinkering with the order of the access where it is necessary to access a plurality of positions on the disk. The SCAN algorithm shown in FIG. 1 is an algorithm in which a given plurality of I/O requests (#1, #2, . . . ) are sorted in the radial direction of the disk and sequentially processed. Reciprocal operation of the head, which will occur if the processing is carried out in the order of arrival of the I/O requests (#1, #2, . . . ), can be prevented and in turn the respective seek times can be reduced. As the algorithm of the head scheduling, many algorithms are known. These are mentioned in detail in for example H. Deitel, "Operating Systems", Addison Wesley, pp. 360–372, 1990.

All of "Reddy 93", "Gemmel 94", and "Chen 93" are predicated on the assumption the use of a SCAN algorithm, therefore are able to suppress the seek time. Accordingly, it is possible to lower the worst value of the overhead and guarantee a higher performance in comparison with "Anderson 92" and "Rangan 93".

However, the only thing which the SCAN algorithm can suppress is the seek time. No allusion has yet been made up to now about reduction of the rotational delay time.

"Reddy 93" assumes that a special function referred to as a zero latency access mechanism exists in the disk. The zero latency access mechanism is a method in which the data is successively read even from the middle of the data at a point of time when the head reaches the desired track and the leading portion of the data which was not in time is read again when the disk rotates one time and that portion returns.

Accordingly, when the disk rotates one time, the desired data can be all reliably read and therefore the total of the rotational delay and the access of data becomes the time of the amount of one rotation at the maximum.

However, since few actual disks utilize this mechanism, it may be that the assumption in "Reddy 93" is not realistic.

On the other hand, "Gemmel 94" adopts a method of estimating the overhead by always adding the maximum value as a result of considering that the rotational delay is an amount for which control and prediction are impossible. This is safe but there is a lot of waste, which poses a problem. Further, "Chen 93" treats the rotational delay as a negligible correction term, but this is not realistic. For example, in recent high speed disks, the rotation cycle is 8.3 mS, while if the SCAN algorithm is used, the maximum value of the seek time can be suppressed to about 6 ms or less. Therefore the rotational delay is dominant. Further, from the viewpoints of the air resistance and the consumed electric power of the motor and resultant heat generated, it is difficult to expect any epoch-making improvements in the rotational speed from this point onward. The reduction of the rotational delay is the biggest problem which should be solved.

It is also pointed out that in the usual file system for computers, the reduction of the rotational delay is important. S. Ng, "Improving Disk Performance Via Latency Reduction", IEEE Transactions on Computers, Vol. 40, No. 1, January 1991, pp. 22–30, 1991 (hereinafter referred to as "Ng 91") mentions a method of reducing the average rotational delay time at the time of a read operation by the method of preparing a copy of the data shifted in phase in the rotational direction etc. However, it is difficult to apply this method for multimedia applications which involve a huge amount of data.

SUMMARY OF THE INVENTION

The present invention was made in consideration with the situations as described above and has as an object thereof to provide a method and apparatus for controlling the access to a recording disk which can realize a high speed random access while maintaining the real time property by suppressing both of the seek time and the rotational delay time. Such a method of controlling the access to a recording disk and an apparatus therefor are preferred as the storage for multimedia data, demand for which has been increasing.

In order to solve the problems of the related art mentioned above and achieve the above object, the method for controlling the access to a recording disk of the present invention determines a skew so that a rotational delay time at an average distance of movement when a head accesses the recording disk becomes short; determines the position of a data block on the recording disk based on at least the determined skew; schedules an order of a plurality of input disk access requests so that an amount of movement of the head becomes small at the time of access with respect to the recording disk by the head; and performs the access to the recording disk by the head based on the result of the scheduling.

Further, the method of controlling the access to a recording disk of the present invention preferably has the determination of the position of the data block on the recording disk carried out based on a gap indicating an angular difference between the start and the end in the same data block in addition to the skew.

Further, the method of controlling the access to a recording disk of the present invention preferably provides data of a plurality of combinations of the skew and the gaps and has the combination data selectively used in accordance with the position on the recording disk.

Further, the method of controlling the access to a recording disk of the present invention changes the size of the data block so that the gap is constant over the entire region from the outside to the inside of the recording disk.

Further, the method of controlling the access to a recording disk of the present invention preferably determines the skew in accordance with the change of the gap of the data block generated due to a difference of radius of the recording track.

Further, the method of controlling the access to a recording disk of the present invention preferably has the scheduling change the order of a plurality of requests for disk access so that they are arranged in order from the nearest one on when the recording head is moved from the current position toward an inner circumference or outer circumference of the recording disk and has the determination of the position of the data block on the recording disk determine the skew and gap so that a difference between a delay time Td(L) given by the following Equation (2) and a seek time Ts(L) near an average seek distance La given by the following Equation (3) becomes sufficiently small in comparison with the rotation cycle:

$$Td(L)=(L \cdot Bc \cdot \theta s + \theta g + 2m\pi)/\omega \qquad (2)$$

$$La=Lt(N-1) \qquad (3)$$

where,

L is a seek distance in units of the number of cylinders;

Bc is a number of data blocks existing in one cylinder;

$\theta s$ is a skew in units of radians;

$\theta g$ is a gap in units of radians;

$\omega$ is a rotational speed (radian/sec) of the disk;

Lt is the maximum value of the distance between access positions of the two ends when arranging the access requests in order in units of the number of cylinders;

N is the number of accesses to be simultaneously processed; and, m is selected so as to become the smallest within a range where Td(L) exceeds the seek time Ts(L) at the seek distance L.

Further, the method of controlling the access to a recording disk of the present invention preferably has the scheduling change the order of a plurality of requests for disk access so that they are arranged in the order of appearance when the head is moved from the current position toward the inner circumference or outer circumference of the recording disk and has the determination of the position of the data block on the recording disk determine the skew and gap so that the delay time Td(L) given by the following Equation (4) is always longer than the seek time Ts(L) and the difference between the delay time Td(L) and the seek time Ts(L) becomes sufficiently small in comparison with the rotation cycle:

$$Td(L)=(L \cdot Bc \cdot \theta s + \theta g)/\omega \qquad (4)$$

Further, the method of controlling the access to a recording disk of the present invention preferably has the memory disk divided into first regions used when the head moves from the inner circumference to the outer circumference and second regions used when the head moves from the outer circumference to the inner circumference; has the determination of the position of the data block on the recording disk determine the optimum skew and gap in the respective regions based on the direction of movement of the head; and has the scheduling selectively access only the first and second regions in accordance with the direction of movement of the head.

Further, the method of controlling the access to a recording disk of the present invention preferably has the first regions and the second regions on the recording disk divide the disk into a plurality of at least two portions along the radial direction and has both of the first regions and second regions allocated so as to be dispersed from the innermost circumference to the outermost circumference on the disk.

The apparatus for controlling the access to a recording disk of the present invention has a skew determining means for determining the skew so that the rotational delay time at the average distance of movement when the head accesses the recording disk becomes short; a data block arranging means for determining the position of a data block on the recording disk based on at least the determined skew; and a scheduling means for scheduling the order of a plurality of input disk access requests so that the amount of movement of the head becomes small at the time of access of the recording disk by the head, wherein the head performs the access to the recording disk by the head based on the results of the scheduling.

Further, the apparatus for controlling the access to a recording disk of the present invention preferably has the data block arranging means perform the arrangement based on a gap indicating the angular difference between the start and the end in the same data block in addition to the skew.

Further, the apparatus for controlling the access to a recording disk of the present invention preferably has the data block arranging means have data on a plurality of combinations of the skew and the gaps and selectively use the combination data in accordance with the position on the recording disk.

Further, the apparatus for controlling the access to a recording disk of the present invention preferably has the data block arranging means change the size of the data block so that the gap is constant over the entire region from the outside to the inside of the recording disk.

Further, the apparatus for controlling the access to a recording disk of the present invention preferably has the skew determining means determine the skew in accordance with the change of the gap of the data block generated due to a difference of the radius of the recording track.

Further, the apparatus for controlling the access to a recording disk of the present invention preferably has the scheduling means change the order of a plurality of requests for disk access so that they are arranged in order from the nearest one on when the recording head is moved from the current position toward an inner circumference or outer circumference of the recording disk and has the data block arranging means determine the skew and gap so that a difference between a delay time Td(L) given by the following Equation (5) and a seek time Ts(L) near an average seek distance La given by the following Equation (6) becomes sufficiently small in comparison with the rotation cycle:

$$Td(L)=(L \cdot Bc \cdot \theta s + \theta g + 2m\pi)/\omega \qquad (5)$$

$$La=Lt(N-1) \qquad (6)$$

where,

L is a seek distance in units of the number of cylinders;

Bc is a number of data blocks existing in one cylinder;

$\theta s$ is a skew in units of radians;

$\theta g$ is a gap in units of radians;

$\omega$ is a rotational speed (radian/sec) of the disk;

Lt is the maximum value of the distance between access positions of the two ends when arranging the access requests in order in units of the number of cylinders;

N is the number of accesses to be simultaneously processed; and, m is selected so as to become the smallest within a range where Td(L) exceeds the seek time Ts(L) at the seek distance L.

Further, the apparatus for controlling the access to a recording disk of the present invention preferably has the scheduling means change the order of a plurality of requests for disk access so that they are arranged in the order of appearance when the head is moved from the current position toward the inner circumference or outer circumference of the recording disk and has the data block arranging means determine the skew and gap so that the delay time Td(L) given by the following Equation (7) is always longer than the seek time Ts(L) and the difference between the delay time Td(L) and the seek time Ts(L) becomes sufficiently small in comparison with the rotation cycle.

$$Td(L)=(L \cdot Bc \cdot \theta s + \theta g)/\omega \qquad (7)$$

Further, the apparatus for controlling the access to a recording disk of the present invention preferably has the memory disk divided into first regions used when the head moves from the inner circumference to the outer circumference and second regions used when the head moves from the outer circumference to the inner circumference; has the data block arranging means determine the optimum skew and gap in the respective regions based on the direction of movement of the head; and has the scheduling means selectively access only the first and second regions in accordance with the direction of movement of the head.

Further, the apparatus for controlling the access to a recording disk of the present invention preferably has the first regions and the second regions on the recording disk divide the disk into a plurality of at least two portions along the radial direction and has both of the first regions and second regions allocated so as to be dispersed from the innermost circumference to the outermost circumference on the disk.

In the method of controlling the access to a recording disk of the present invention and the apparatus therefor, when arranging the data blocks, the blocks are arranged shifted in the circumferential direction (given a skew), therefore control can be carried out so that the start of the desired data does not pass the position of the head during the seek operation. For this reason, it is not necessary to wait for the time until the start of the desired data returns again, both of the seek time and the rotational delay time are suppressed low, and a random access can be realized at a high speed while maintaining the real time property.

Further, in the method of controlling the access to a recording disk of the present invention and the apparatus thereof, the skew is changed between the regions used when the head moves from the outer circumference to the inner circumference and the regions used when the head moves from the inner circumference to the outer circumference, whereby the optimum skew can be given irrespective of the direction of movement of the head.

BRIEF DESCRIPTION OF THE DRAWINGS

These and other objects and features of the present invention will become more apparent from the following description of the preferred embodiments given with reference to the attached drawings, in which:

FIG. 9 is a graph for explaining the content of the processing at step S3 shown in FIG. 3;

FIG. 10 is a graph for explaining the overhead in a case where both of the seek and the rotational delay are considered;

FIGS. 11A, 11B and 11C are views for explaining one example of distribution of accesses on the disk;

FIG. 16 is a chart for explaining the content of the block map in the apparatus for controlling the access to a recording disk shown in FIG. 13.

DESCRIPTION OF THE PREFERRED EMBODIMENTS

Below, an explanation will be made of the method of controlling the access to a recording disk according to embodiments of the present invention and an apparatus therefor.

First Embodiment

Figure 1:
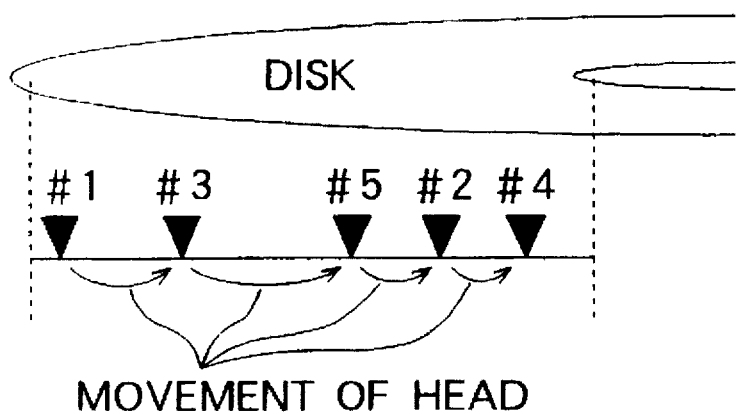
FIG. 1 is a diagram for explaining the related art.
Figure 2:
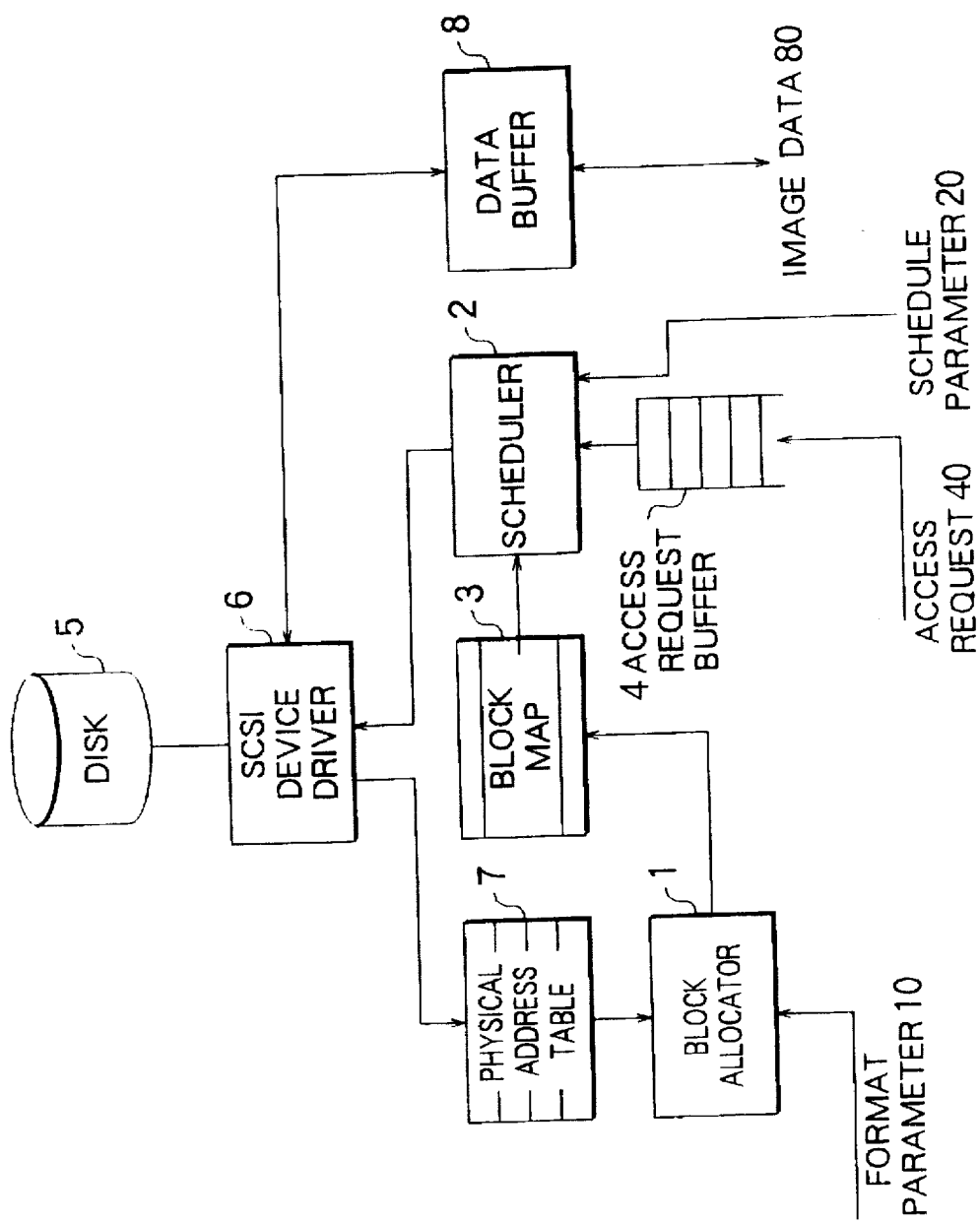
FIG. 2 is a block diagram of the configuration of an apparatus for controlling the access to a recording disk according to a first embodiment of the present invention.

FIG. 2 is a block diagram of a configuration of an apparatus for controlling the access to a recording disk according to the present embodiment.

The apparatus for controlling the access to a recording disk according to the present embodiment is realized by operation of software in for example a computer. Each block shown in FIG. 2 represents a main program module or main data structure.

A block allocator (arranging means) 1 determines how the data are arranged on a disk 5 based on a given format parameter 10. The disk 5 may be, for example, a magnetic disk, a magneto-optic (MO) disk, or a hard disk (HDD) is used.

The format parameter 10 includes the size of a first data block, the average head movement distance La when performing the SCAN schedule, the seek time function Ts(L) of the drive to be used, and the physical format of the disk 5.

The average head movement distance La is given by the following Equation (8) from the total number of cylinders Lt of the disk and the number N of the accesses processed by one scan.

$$La=Lt/(N-1) \quad (8)$$

Figure 5:
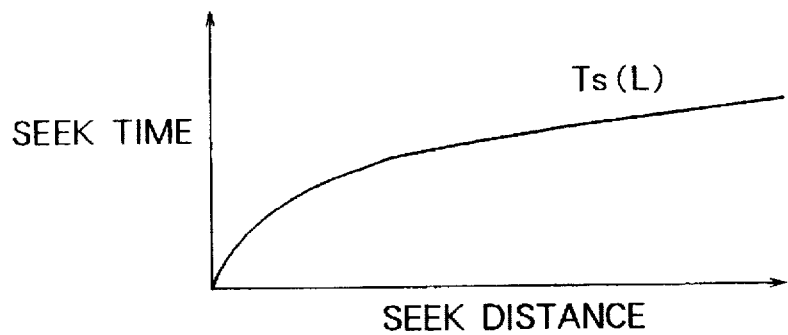
FIG. 5 is a graph showing a relationship between a seek time and seek distance of a drive.

The seek time Ts(L) of the drive is a function of the seek distance L (number of cylinders). The value thereof is determined by the mechanical characteristics of the disk drive used. This example is shown in FIG. 5. How many access requests are processed together by a scan is determined by the nature of the application using this disk, the performance required there, the amount of the buffer memory which can be used, etc. The larger the number N of the access requests to be scanned together, the more improved the random access performance of the disk, but there is a side effect that the response time is increased as the amount of the buffer memory required is increased.

These format parameters 10 are determined by a central processing unit (CPU) (not illustrated) having a control program which manages the entire system, and these format parameters 10 are provided to the block allocator 1. In the example in which the present embodiment is utilized for non-linear editing, N=10 and La=300 were given to the block allocator 1. Furthermore, the size of the first data block corresponds to one sheet of image data and is about 700 KB (kilobytes) in the case of the CCIR-601 format used in broadcasting stations etc. Of course, this numerical value can be freely set in accordance with the purpose and various requested specifications.

The block allocator 1 determines at which position on the disk 5 each block is to be placed based on the given format parameter 10. In this example, one block equals one frame of an image, but of course the fundamental concept is similar even with data obtained by dividing an MPEG or other compressed image into suitable lengths, or even with audio data.

The disk 5 can be accessed for every what is normally called a "sector" region. One sector usually has a size of from about 512 B (bytes) to about 4 KB. A doughnut shaped region in which these sectors are arranged in a circle is referred to as a "track". Further, the cylindrical region comprising the group of the same tracks of a superimposed plurality of magnetic media is referred to as a "cylinder".

Figure 6:
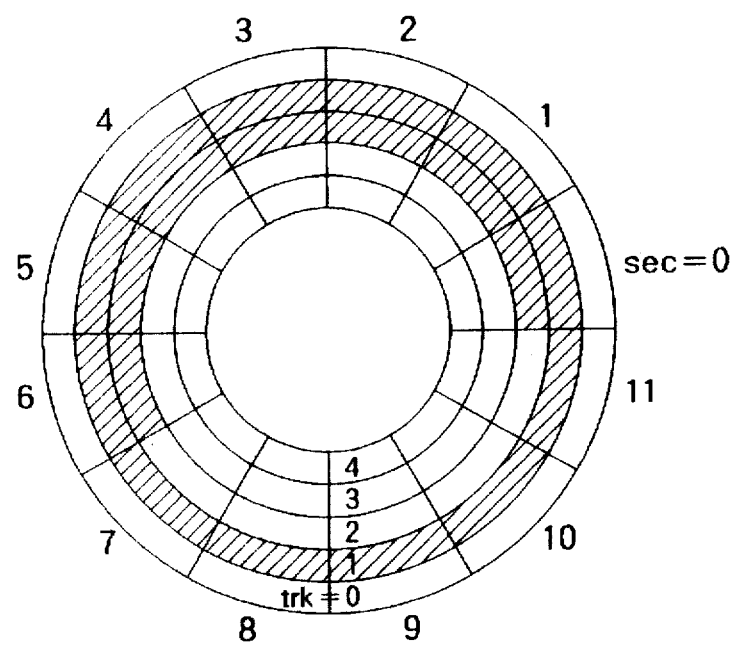
FIG. 6 is a diagram for explaining a method of arrangement of blocks on a disk by the block allocator.

One block of the video and audio data is usually larger than one sector, therefore the block allocator 1 allocates a plurality of sectors for each block. FIG. 6 shows a simple example of a case where there is one magnetic medium. The portion indicated by the hatching in FIG. 6, that is, an entire circumference of the track "1", and the sectors "0" to "6" of the track "2" correspond to one block. In this example, since there is only one medium, a "track" and a "cylinder" have the same meaning, but in the case of a disk drive in which there are a plurality of magnetic media, if all parts of the same cylinder are completely used, the blocks are allocated to use the adjoining cylinders.

The allocation to the sectors is carried out for all blocks. The result thereof is written on a block map 3, whereupon the role of the block allocator 1 ends. The block allocator 1 designates a position of a sector by the set of the cylinder number, the media number (which sheet of media), and the sector number. However, in a drive of a SCSI (ANSI Small Computer System Interface) specification, which has become the most popular in recent years, serial numbers (local sector numbers, called "logical block addresses" in SCSI, but here referred to as logical sector numbers so as to avoid confusion with the video and audio data blocks) are given to all sectors in the drive and these are used to access the data. For this reason, the correspondence between the logical sector numbers determined by the drive and the physical addresses, that is, the cylinder numbers, media numbers, and sector numbers, is preliminarily stored in a physical address table 7. The block allocator 1 converts the desired physical address to the logical sector number determined by the SCSI referring to the physical address table 7 and enters this on the block map 3.

Figures 7, 8:
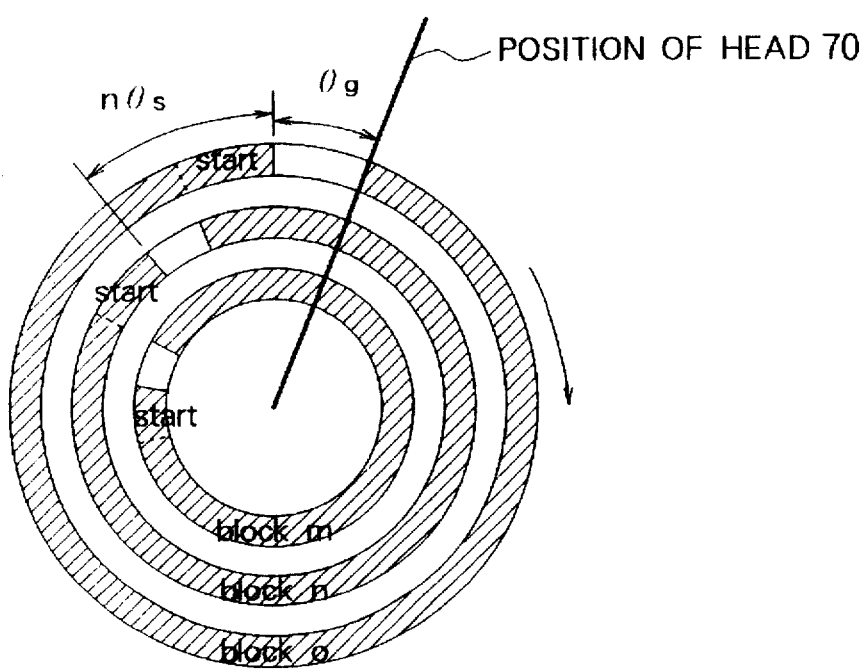
FIG. 7 is a chart for explaining the content of the block map.
FIG. 8 is a view for explaining the content of the processing at step S3 shown in FIG. 3.

FIG. 7 shows an example of a block map. The information corresponding to the block "0" corresponds to the hatching portion of FIG. 6.

On the other hand, the scheduler 2 operates as follows. First, the CPU for managing the entire system determines the schedule parameter 20 and provides the schedule parameter 20 to the scheduler 2. The schedule parameter 20 includes a constant N indicating how many access requests are processed together by one scan.

When the operator instructs the start of reproduction of a motion picture image recorded on the disk 5, the not illustrated CPU having a suitable control program issues requests for access to the blocks in which the images constituting the motion picture image are stored for every image. These access requests 40 are stored in the access request buffer 4. The scheduler 2 sequentially takes out N number of access requests 40 stored in the access request buffer 4 from the access requests which arrived earlier, finds the positions of the data corresponding to these requests on the disk 5 referring to the block map 3, changes the order of the access requests so that the amount of movement of the head becomes the minimum, and generates an instruction for access to the disk 5. The instruction for the access is made to match the external interface of the disk drive, and therefore is converted to the SCSI protocol by the SCSI device driver 6 and is then transferred to the disk 5. The data read from the disk 5 is stored temporally in the data buffer 8 and further transferred to the video interface of the apparatus.

When the operator instructs the recording of data representing motion picture images, the not illustrated CPU having a suitable control program issues requests for access to the block in which the images constituting the motion picture image are stored for every image. These access requests 40 are stored in the access request buffer 4. At the same time, the image data 80 constituting the motion picture are transferred from a video interface (not shown) to the data buffer 8, and such image data 80 is temporally stored in the data buffer 8. The scheduler 2 sequentially takes out N number of access requests 40 stored in the access request buffer 4 from the access requests which arrived earlier. Next the scheduler 2 finds on the disk 5 the position of the data corresponding to these requests, referring to the block map 3. In addition, the scheduler 2 changes the order of the access requests so that the amount of movement of the head becomes the minimum, and generates an instruction for access of the disk 5. The instruction for the access is made to match the external interface of the disk drive, and therefore is converted to the SCSI protocol by the SCSI device driver 6 and is then transferred to the disk 5.

Below, a detailed explanation will be made of the operation of the block allocator 1.

Figure 3:
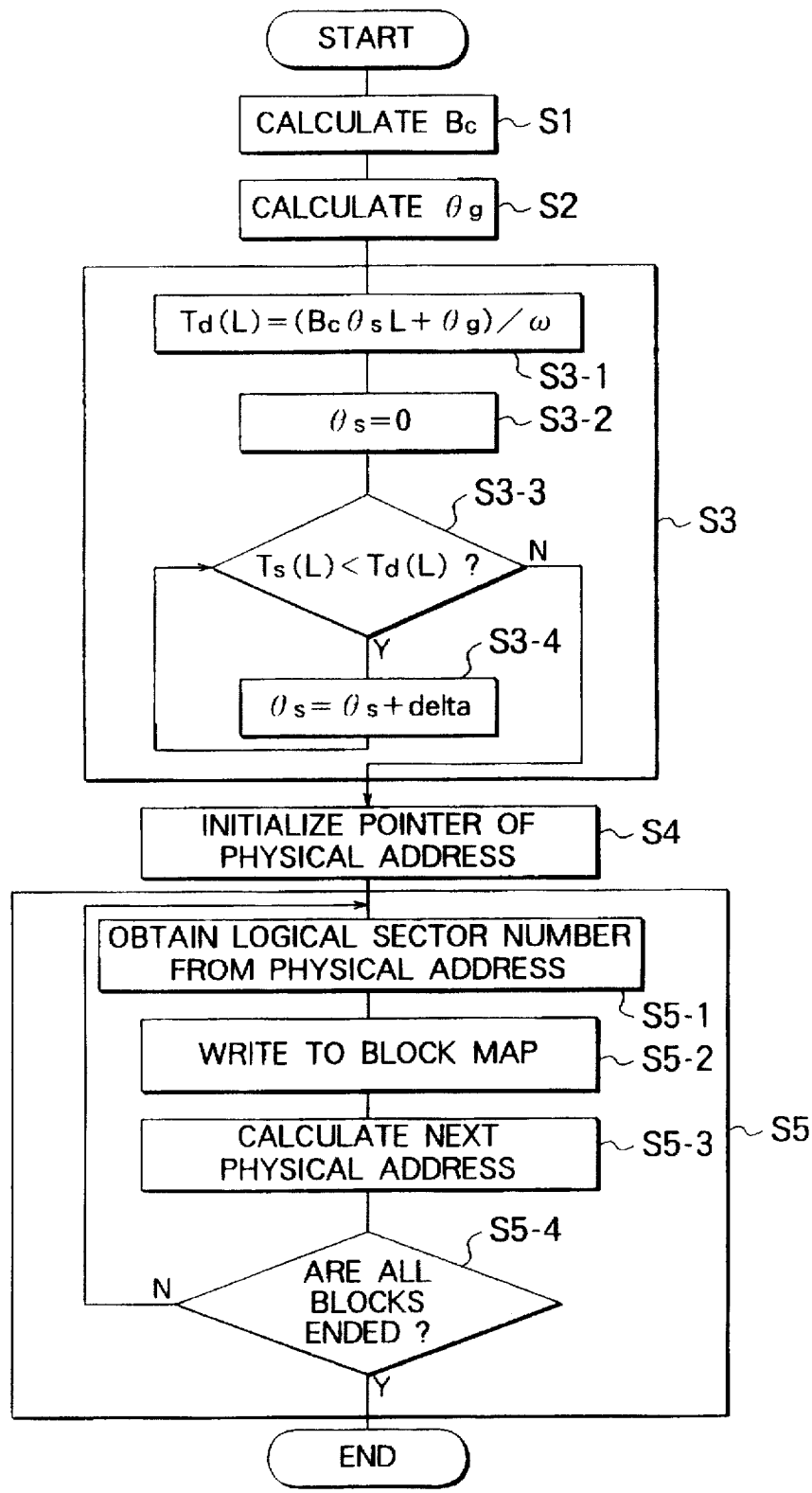
FIG. 3 is a flow chart for explaining the processing in the block allocator shown in FIG. 2.

As the format parameter 10 in FIG. 2, when the size of one block, the average distance of movement of the head La when performing the SCAN schedule, the seek time function Ts(L) of the drive to be used, the physical format of the disk 5 (number of cylinders, number of sectors in one track, and number of media constituting the cylinder) are given, the block allocator 1 determines the position of each block on the disk 5 by the procedures of steps S1 to S5 shown in FIG. 3.

At step S1, it is calculated how many blocks of the image exist in one cylinder (Bc). The total number of the sectors in one cylinder is obtained by multiplying the number of sectors in the track by the number of the media. When this is divided by the number of sectors necessary for storing one block, Bc is found.

The gap θg is found at step S2. The gap is the angular difference between the leading sector and the final sector of the block. As an example, in the case of the block indicated by hatching in FIG. 6, the start is the sector "0" of the track "1", and the end is the sector "6" of the track "2", therefore the gap θg is 5/12ths of the circumference, that is, 5π/6 radian.

The skew θs is found at step S3 based on the above data. Here, the skew θs means the angular difference in the circumferential direction between heads of adjoining blocks. First, by using the position of the head when the reading of a certain block is ended as the start point, when represented by an equation, the time Td(L) until the head of the data reaches the same angle in the circumferential direction at the position where the head has moved from the start point by an amount of L cylinders, the following Equation (9) is obtained:

$$Td(L) = (L \cdot Bc \cdot \theta s + \theta g + 2 \cdot m \cdot \pi)/\omega \qquad (9)$$

where,

L is the seek distance in units of the numbers of cylinders;

Bc is the number of blocks existing in one cylinder;

θs is the skew in units of radians;

θg is the gap in units of radians;

ω is the rotational speed (radian/sec) of the disk; and m is any integer where Td(L) becomes positive.

FIG. 8 explains the meaning of Equation (9) on the disk. In FIG. 8, assume that the access of the block "0" has just been ended. Assume that the head is located in the direction of the angle 7θ when seen from the center. Now, when desiring to access the same block "0" again, it is necessary to wait until the disk rotates exactly by the amount of the gap θg, therefore the delay time of θg/ω is caused.

Further, for the head of the block "n", it is necessary to wait until the disk rotates exactly by the angle of the sum of the gap θg of the block "0" and n number of blocks worth of skew (nθs). This takes nθs/ω worth of time. Since the disk is rotating, the start of the data reaches the position at which the head placed at a time obtained by adding a whole multiple of the rotation cycle to the time obtained in this way. When the head moves by n number of blocks, this corresponds to movement of n/Bc cylinders in terms of the number of cylinders, therefore when drawing a graph while plotting the number of cylinders on the abscissa and plotting the delay time until the start is reached on the ordinate, FIG. 9 is obtained. The larger the skew, the larger the inclination of the group of lines. Note that, in the above theory, it was assumed that the position (angle) of the head in the circumferential direction seen from the center was constant irrespective of the distance from the center. In actuality, there exists a case where the position is not correctly constant depending on the mechanism of the head, but the influence thereof is sufficiently small, and therefore it can be usually ignored.

As shown in FIG. 9, the time until the start of the block arrives below the head in each cylinder is obtained by the Equation (9). However, since the head must move to the desired cylinder within this time, the delay time becomes the time until the start of the block appears the first time after the seek operation. This is the overhead Td(L) which considers both of the seek and the rotational delay. FIG. 10 shows an example of this and Equation 1 shows the definition thereof. The actual overhead (delay time) is indicated by the bold line in FIG. 10.

Note that the function of the seek time is indicated by the dotted line. In the figure, Trot is one rotation cycle.

At step S3-1, the formula of the straight line of m=0 in Equation 3 and FIG. 9, that is, the formula indicated by the following Equation (10), is found:

$$Td(L) = (L \cdot Bc \cdot \theta s + \theta g)/\omega \qquad (10)$$

The subsequent steps S3-2, S3-3, and S3-4 are the steps for selecting the skew θs so that this straight line is always higher (larger) than the function Ts(L) of the seek time and substantially in contact with the function of the seek time. The straight line of m=0 of FIG. 10 is obtained by using θs selected in this way.

Steps S4 and S5 determine the position of each block on the disk over the entire area of the disk by using the skew and gap obtained in the above way.

At step S4, the pointer of the physical address is initialized to (0/0/0) at first.

Next step S5 is a loop repeated for all blocks. In the loop, first, at step S5-1, the logical sector number is obtained from the physical address referring to the physical address table. At step S5-2, information such as this and the physical address are written on the block map 3. The content of the block map 3 is shown in FIG. 7.

When the processing heretofore is ended, the pointer of the physical address is moved forward in preparation for the processing of the next block. The pointer Ppa of the physical address is updated at step S5-3. At step S5-4, it is decided for all blocks whether or not the processing of steps S5-1 to S5-3 has been carried out. If it has not been carried out, the processing of steps S5-1 to S5-3 is carried out for the blocks for which the processing had not been carried out.

Here, the arrangement of the N-th block on the disk is:

(1) Backward from the allocated block and (2) In a region in which the sector having the angular difference from the start of the 0-th block nearest Nθs is defined as the start.

Next, an explanation will be made of the worst overhead in the method of controlling the access to a recording disk according to the present embodiment.

In general, the access request 40 is generated with respect to all positions on the disk 5. The positions processed by one scan have the unevenness in distribution as shown in FIG. 11A or 11B and are conversely distributed uniformly as shown in FIG. 11C. In this example, the head moves among six access requests 40, therefore five random accesses and the overheads accompanying this are generated. The total sum of the overheads with respect to these five random accesses becomes the worst in the case where all the accesses are uniformly distributed when the function of the overhead exhibits an upward convex shape (FIG. 11C). When there is unevenness in the distribution, the total sum of the overheads becomes smaller than this. In other words, when the overhead in the average distance of movement La of the head is repeatedly generated, the total sum of the overheads becomes the worst (largest).

Figure 12:
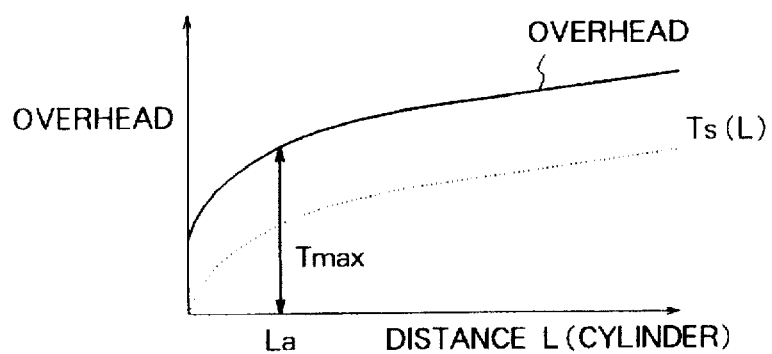
FIG. 12 is a graph for explaining the overhead in a conventional SCAN algorithm.
Figure 13:
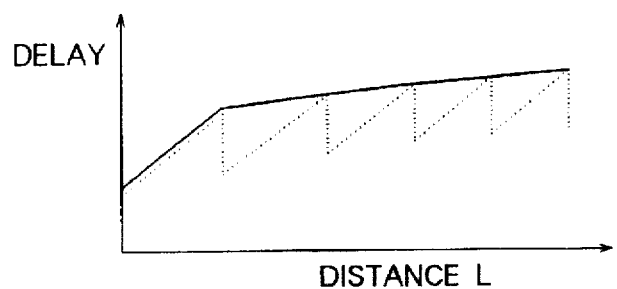
FIG. 13 is a graph for explaining the relationship between a seek distance L and a delay in a case of using an upward convex function enveloping a sawtooth function.

Td(L) of FIG. 10 is a sawtooth function. If Td(L) is replaced by a function having an upward convex form that envelopes this from the top, the above theory basically stands. An example of such a function is shown in FIG. 12. That is, the worst overhead per one access becomes the value obtained by reading the Td(L) value at the position where the distance is La in the graph of FIG. 10 (Tmax in the figure). As mentioned before, this is an approximation, but as in the example of FIG. 10, the function of Td(L) and the function enveloping this from the top usually coincide with each other near La, therefore it can be considered in actuality that there is no error. Further, the approximation is on the safe side (side on which the overhead is estimated larger than it is), therefore there is no risk of estimating the worst value smaller than the original value.

At step S3 shown in FIG. 3, the skew was selected so that one of the group of straight lines of the rotational delay given by the Equation (9) is located at a position higher than the function Ts(L) of the seek time but near this as much as possible. By this, Td(L) can be made small near the distance La, and consequently the worst overhead Tmax can be made smaller.

FIG. 12 shows the overhead in a conventional SCAN algorithm. In the conventional SCAN algorithm as well, the total sum of the overheads becomes the worst when the accesses are uniformly distributed. However, unlike the present embodiment, there is no consideration given with respect to the rotational delay, therefore even after the seek operation of the head is ended, it must be considered that a rotational delay of one rotation is generated in the worst case. For this reason, a value obtained by adding the cycle Trot of one rotation to the seek time Ts(La) at La becomes the worst overhead. As apparent from the comparison of FIG. 12 and FIG. 10, this becomes a considerably larger value than that of the method according to the present embodiment. In our experiments, it was confirmed that the worst overhead became almost half in the present embodiment in comparison with that by the conventional SCAN algorithm.

As explained above, in the apparatus for controlling the access to a recording disk according to the present embodiment, by suitably selecting the skew and gap, it is possible to suppress the overhead Td(L) in the average head movement distance La to the lowest level, and the rotational delay time can be made small by this. In the flow chart shown in FIG. 3, the size of the block had a given fixed value, but according to the purpose, the size of the block can be selected within a certain range. In this case, both of the gap θg and the skew θs can be changed, and therefore the position of the straight line can be finely controlled so that it approaches the seek time near La.

By the above method, the overhead accompanying the movement among the blocks is greatly improved. Where a block is large and extends over a plurality of tracks or a plurality of cylinders, however, the time accompanying the change of the tracks and the time of movement to the adjoining cylinder must also be considered. The times necessary for the change of the tracks and the movement to the adjoining cylinder are constant too, therefore by giving a skew among the tracks or cylinders so that the data arrives just beneath the head after these times elapse, it is possible to prevent a long rotational delay from being generated in the block along with the change of the tracks and the movement among the cylinders. For this purpose, the block allocator 1 has another set of skew and gap for access in a block at the highest speed other than the skew and gap for the movement among the blocks already explained. At steps S4 and S5 in FIG. 3, it is sufficient to arrange the blocks by using the latter skew and gap when arranging one block on the disk. It is possible to make the latter gap zero at all times and just use the skew to absorb the change of the tracks and the time of movement among cylinders.

Next, an explanation will be made of the operation of the scheduler 2.

Figure 4:
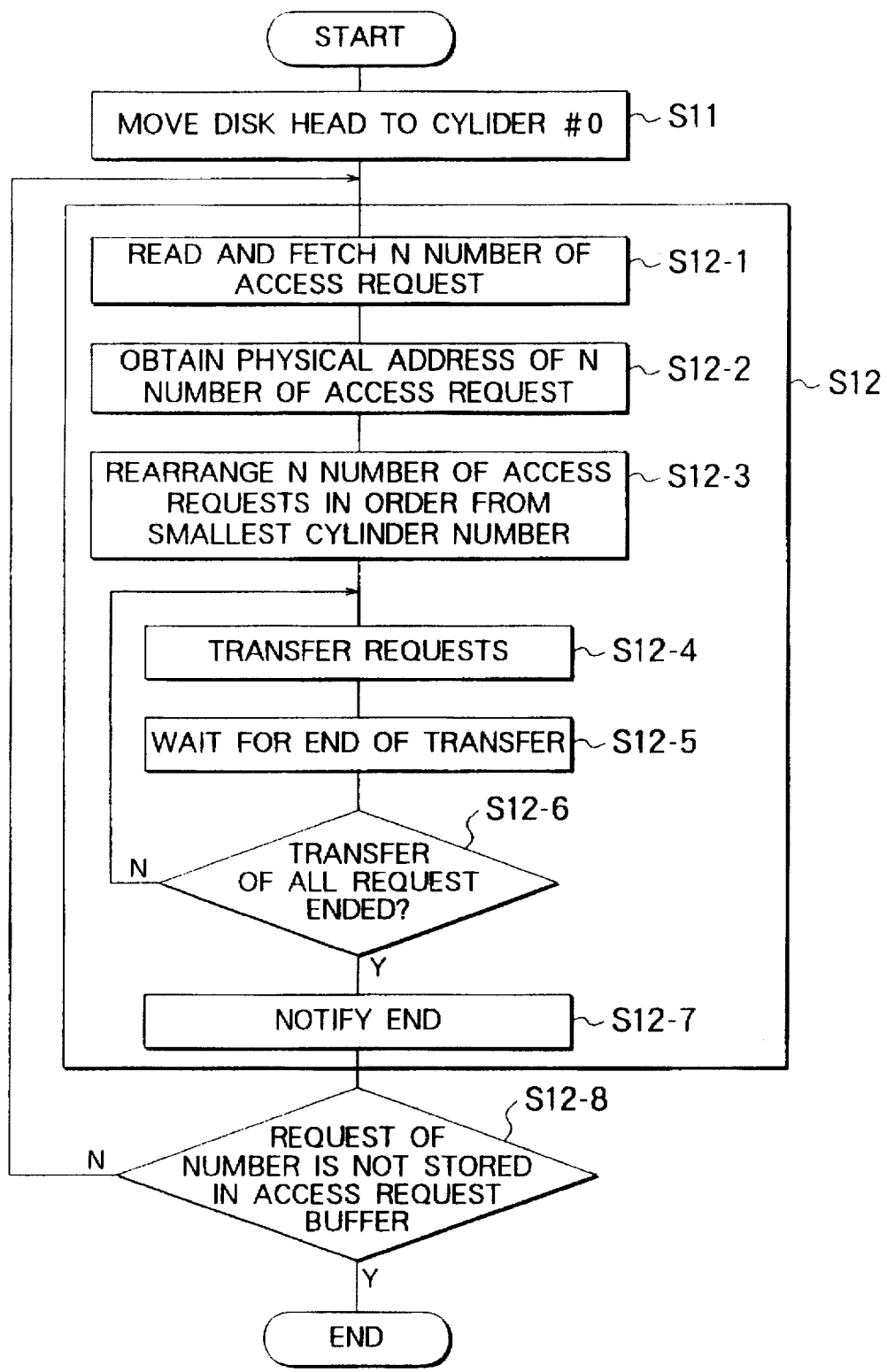
FIG. 4 is a flow chart for explaining the processing in the scheduler shown in FIG. 2.

FIG. 4 shows a flow chart of operation of the scheduler 2. At step S11, the head of the disk is moved to the cylinder "#0" at first. Then, the processing routine proceeds to step S12 at which the actual scheduling is carried out.

At step S12, N number of access requests are read and fetched from the access request buffer in the order from the previous (older) requests in time at step S12-1. In one access request, the numbers of the blocks which should be accessed and the leading address of the data buffer used for the data transfer are described. Further, the number N is a constant preliminarily given from another control program (not shown).

At step S12-2, the block map 3 is referred to for each of the N number of access requests, and the physical addresses of the blocks which should be accessed (cylinder numbers, media numbers, and sector numbers) are confirmed. Subsequently, at step S12-3, these N number of access requests are rearranged in an order from the smallest cylinder number up. By this operation, the scheduling of the SCAN algorithm is realized. At step S12-4, these rearranged access requests are sent to the disk via the device driver in the order from the smallest cylinder number up and actual accesses and data transfers are carried out. When one block's worth of access instructions is issued, the end of the transfer is awaited at step S12-5, and then the next access instruction is issued. By repeating this N number of times (S12-6), the processing of N number of access requests is ended. At step S12-7, the control program is notified that the processing of the N number of accesses is ended, and the series of processing concerning the N number of access requests is ended.

Finally, at step S12-8 it is determined whether an N number of access requests is not stored in the access request buffer 4. If not, the scheduler 2 returns to step S12-1, takes out the next N number of access requests, and continues the processing. If there are not an N number of requests in the access request buffer, the processing is paused at this step.

Note that, for example, the block allocator 1 arranges the blocks and changes the sizes of the blocks so that the gap is constant over the entire area from the outside to the inside of the disk 5, whereby the real time property of the access can be further enhanced.

Second Embodiment

The scheduler 2 of the first embodiment explained above moved up to the outermost access position at the start of the next scan. Namely, when the last access was carried out at steps S12-4 and S12-5 in FIG. 4, the head performed the innermost access among the N number of accesses. By the first access of the loop for processing the next N number of accesses, movement to the outside cylinder having the smallest cylinder number is caused. Concerning this movement, a seek operation of the largest length from the innermost circumference to the outermost circumference and a rotational delay of one rotation are generated in the worst case. Since they occur for every N number of accesses and since the accessing of data cannot be carried out during this time, this must be added to the total sum of the overheads of the entire scan. Of course, the performance is lowered by that amount.

Of course, it is possible to access the disk even during the movement from the inner circumference toward the outer circumference, but since the direction of movement of the head becomes reversed, the first term in the Equation (15), that is, the sign of the term of the skew, is reversed. For this reason, the optimum skew and gap in the case of the movement from the outer circumference toward the inner circumference do not always become suitable parameters for movement in the reverse direction. This becomes a cause of the reduction of the performance when the head moves in the reverse direction.

Figure 14:
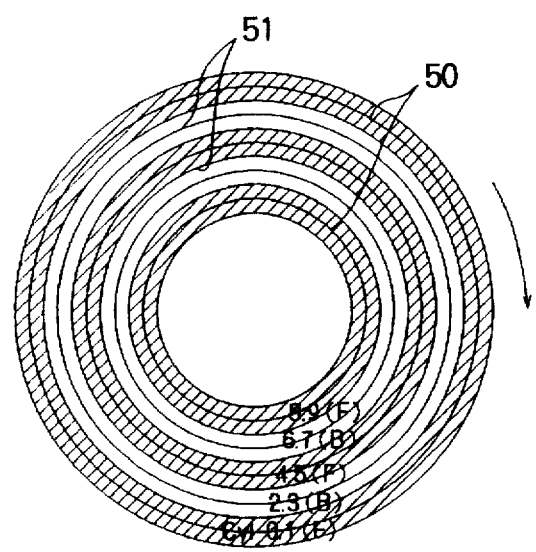
FIG. 14 is a view for explaining the processing in the block allocator of the apparatus for controlling the access to a recording disk according to a second embodiment of the present invention.

The apparatus for controlling the access to a recording disk according to the second embodiment of the present invention, which will be explained below, handles this problem and provides a method of performing high speed data transfer even when the head returns from the inner circumference to the outer circumference. First, the block allocator 1 divides the cylinders into cylinders 50 indicated by the hatching used when performing a scan from the outside to the inside and cylinders 51 used when performing a scan from the inside to the outside as shown in FIG. 14. In FIG. 14, the cylinders 50 marked by the letters F are used when performing a scan from the outside to the inside, and the cylinders 50 marked by the letters B are used when performing a scan from the inside to the outside. In FIG. 14, the cylinders are divided into groups of two cylinders, but the number of cylinders in a group is not restricted to this. The cylinders may be divided into groups of suitable units.

Figure 15:
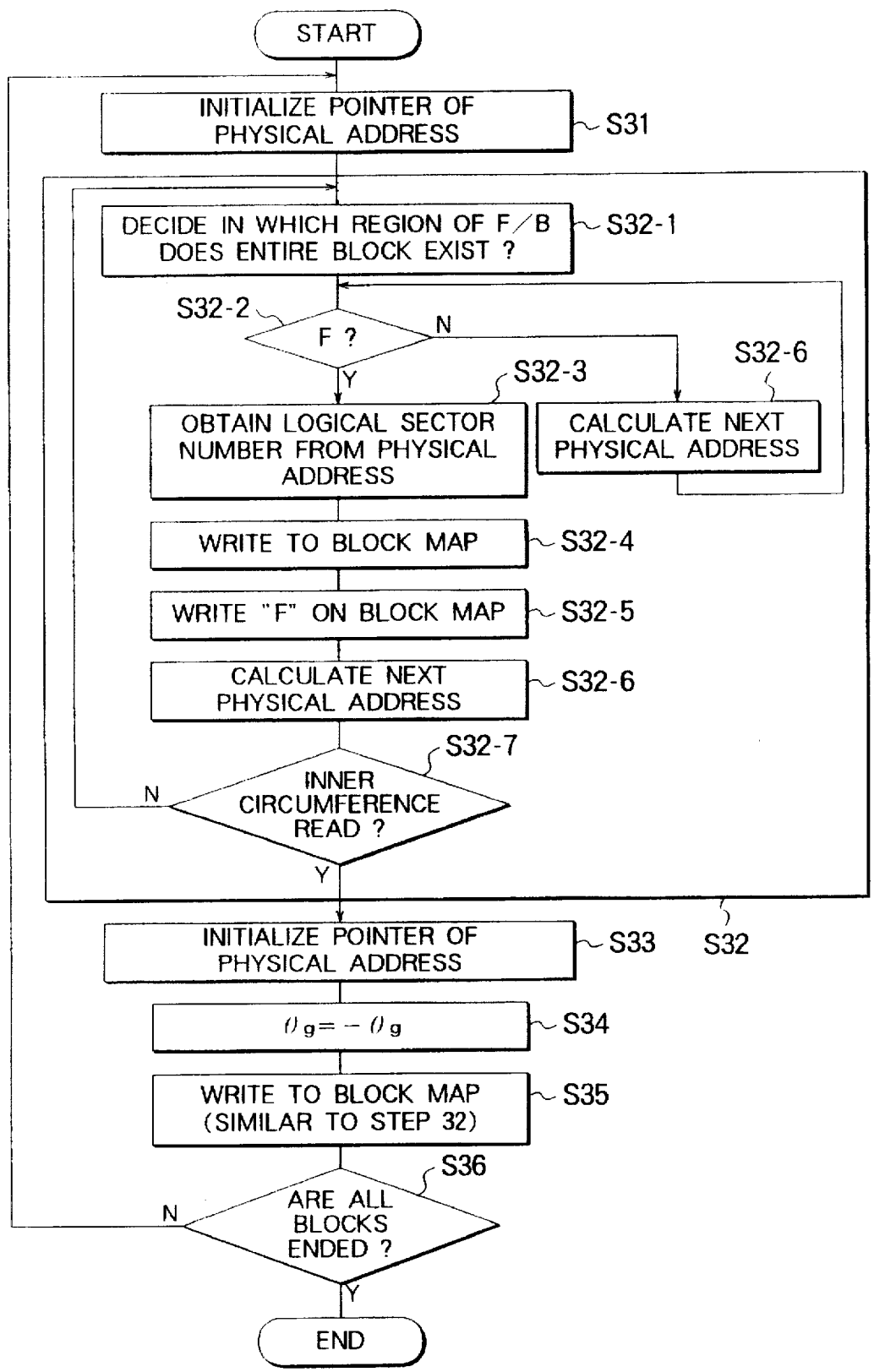
FIG. 15 is a flow chart for explaining the processing of the block allocator in the apparatus for controlling the access to a recording disk shown in FIG. 14.

In the same way as in the apparatus for controlling the access to a recording disk according to the first embodiment mentioned before, the processing of steps S4 and S5 shown in FIG. 3 after finding the skew and the gap according to step S1 of FIG. 3 is changed as shown in FIG. 15.

In FIG. 15, step S31 initializes the pointer of the physical address to be allocated in the same way as in the first embodiment.

Subsequently, the respective blocks are allocated to the disk at step S32. Step S32 is a loop repeated for all blocks. At step S32-1, it is judged whether an entire block belongs to the regions of F or the regions of B based on the physical address of the block during the processing.

Step S32-2 is a branch based on the result of this judgement. If one entire block belongs to the regions of F, step S32-3 to step S32-7 are executed. Among them, step S32-3 is the same as step S5-1 in FIG. 3 and is a step for examining the corresponding logical sector number by using the physical address table, while step S32-4 performs the write operation on the block map 3 in the same way as step S5-2 in FIG. 3.

In comparison with the block map 3 of the first embodiment shown in FIG. 7, in the block map 3 in the present embodiment, a flag indicating whether that block exists in the regions of F or the regions of B is added. This situation is shown in FIG. 16. Step S32-5 is a step of writing F in this portion.

Where a block does not completely belong to the regions of F in the branch of step S32-2, the allocation to that physical address is not carried out, and a physical address that completely becomes inside the regions of F is sought. At step S32-6, the next physical address is found from the skew and the gap, and further it is examined as to which regions it belongs. Step S32-7 determines whether or not the inner circumference has been read. If not, the processing routine jumps to step S32-1, after which in step S32-2 judgement is again executed. In this way, re-attempts are repeated, during which a physical address whereby the entire block belongs to the regions of F is obtained. This is allocated to the block.

For example, in FIG. 16, in the case of the system of arrangement of the first embodiment, the next block No. 5 was placed at the physical address (1/5/8), but the latter half of the block extends over the cylinder No. 2 by this. The cylinder No. 2 is the regions of B, therefore these regions are not allocated, and the address which can be allocated next is sequentially found. The physical address pointer is successively advanced and the physical address (4/2/0) is allocated for the block No. 5. As in the first embodiment, both in the method for allocating the blocks without skipping the middle and in the method for allocating the blocks while skipping the middle as in this embodiment, the relationship between the distance (number of cylinders) of the radial direction and the skew amount must be kept constant, therefore the method of allocation as explained above is used. This is the reason why use is not started from the leading (4/0/0) of the cylinder No. 4. The above processing is repeated until the physical address reaches the innermost circumference.

Steps S33 to S36 perform similar processing with respect to the regions of B. The start of the regions of B is the cylinder No. 2 as shown in FIG. 14, therefore the pointer of the physical address is initialized to this address at step S33.

Subsequently, the sign of the skew is reversed at step S34. The regions of B are accessed from the inner circumference toward the outer circumference, therefore the amount of movement of the cylinder becomes negative. Therefore, when also the sign of the skew is reversed corresponding to this, the optimum skew for the movement of the head from the inside to the outside is obtained.

Step S35 is the step for actually writing the data on the block map. This portion is similar to steps S32-1 to S32-6. Note however, that this is different from steps S32-1 to S32-7 in the following ways:

(1) The data is written on the block map only when the entire block is in the regions of B. Otherwise, another attempt is made by a new physical address.

(2) B is written on the block map.

Finally, at step S36 it is determined whether all of the blocks to be processed have been processed. If not, the processing returns to step S31. If all of the blocks to be processed have been processed, the processing is paused at this step.

FIG. 16 shows an example of a case where 5012 blocks are allocated to the regions of B in total. At this time, the block number of the regions of B is started from 5013, and the allocation of the blocks is repeated until the head reaches the innermost circumference again.

Since the block allocator 1 is given the configuration as described above, the scheduler 2 takes out only the requests for accessing the regions of B from the address request buffer for scheduling when the head moves from the outer circumference to the inner circumferential direction and takes out only the requests for accessing the regions of B from the address request buffer for scheduling when this is completed and the head moves from the inner circumference to the outer circumference. By this, irrespective of the direction of movement of the head, the rotational delay can be always suppressed to the minimum level. In the first embodiment, therefore, while a delay time was caused for the head reaching the inner circumference to return to the outer circumference, there is no such delay time in the present second embodiment, so the performance of the disk is improved.

Note that, it was mentioned in the first embodiment that, when one block was large and extended over a plurality of tracks and sectors, the efficiency was good if another skew considering these times was given. In the present second embodiment, use of a similar technique is possible. In the present second embodiment, when the head moves from the inner circumference toward the outer circumference, the head sequentially moves from the inside cylinder to the outside cylinder also in the accesses within a block, therefore a skew for obtaining the time necessary for the cylinder movement may be given in a reverse direction to that of moving from the outer circumference toward the inner circumference.

Note that, as shown in FIG. 14, by providing the cylinders 50 and the cylinders 51 so that they are dispersed from the innermost circumference to the outermost circumference on the disk, the performance of the disk access can be further improved.

As stated above, according to the method of controlling the access to a recording disk of the present invention and the apparatus thereof, the overhead of the recording disk, that is, the sum of the seek time and the rotational delay time, can be reduced and, in addition, the maximum value thereof can be guaranteed to be a low value.

Further, according to the method of controlling the access to a recording disk of the present invention and the apparatus thereof, by giving a skew corresponding to the direction of movement of the head for every region, it is possible to reduce the overhead irrespective of the direction of movement of the head.

It is to be understood that during or after the period during which the head accesses the disk, scheduling for the next access movement of the head is determined. When this next access is started, the head is moved to a start position which is defined by the determined scheduling for such next access movement of the head. In the case of the first access movement of the head after power-up of the apparatus of FIG. 2, the head is moved to a start position defined by the first determined scheduling after power-up.

While the present invention has been described above with reference to preferred embodiments, it is not limited to those embodiments and includes all modifications apparent to those skilled in the art.

What is claimed is:

1. A method of controlling access to a recording disk, comprising the steps of:

determining a skew which minimizes a rotational delay time at an average distance of movement when a head accesses the recording disk;

determining a position of a data block on the recording disk based on at least the determined skew;

scheduling an order of a plurality of input disk access requests to minimize an amount of movement of the head when the head accesses the recording disk; and accessing the recording disk by the head based on the result of the scheduling.

2. A method of controlling access to a recording disk as set forth in claim 1, wherein the determination of the position of the data block on the recording disk is based on, in addition to the determined skew, a gap indicating an angular difference between a start and an end of the same data block.

3. A method of controlling access to a recording disk as set forth in claim 2, further comprising the steps of:

determining combination data regarding each combination of the skew and the gap for a plurality of data blocks; and selectively using the combination data in accordance with a position of each data block on the recording disk.

4. A method of controlling access to a recording disk as set forth in claim 1, wherein the size of the data block is changed so that the gap is constant over the entire region from the outside to the inside of the recording disk.

5. A method of controlling access to a recording disk as set forth in claim 1, wherein the skew is determined in accordance with a change of a gap of the data block based on a difference of radius of the recording track.

6. A method of controlling access to a recording disk as set forth in claim 1, wherein the step of scheduling changes the order of a plurality of requests for disk access so that they are arranged in an order starting from one nearest to the head when the head is moved from the current position toward one of an inner circumference and outer circumference of the recording disk and; and the step of determining the position of the data block on the recording disk is based upon, in addition to the skew, a gap indicating an angular difference between a start and an end of the same data block, such that a difference between a delay time Td(L) and a seek time Ts(L) near an average seek distance La becomes sufficiently small in comparison with a rotation cycle, where, $$Td(L)=(L \cdot Bc \cdot \theta s + \theta g + 2m\pi)/\omega, \text{ and}$$

$$La=Lt/(N-1)$$

where,

L is a seek distance in units of the number of cylinders;

Bc is a number of data blocks existing in one cylinder;

θs is a skew in units of radians;

θg is a gap in units of radians;

ω is a rotational speed (radian/sec) of the disk;

Lt is a maximum value of the distance between access positions of two ends when arranging the access requests in order in units of the number of cylinders;

N is a number of accesses to be simultaneously processed; and, m is selected so as to become the smallest within a range where Td(L) exceeds the seek time Ts(L) at the seek distance L.

7. A method of controlling access to a recording disk as set forth in claim 1, wherein:

the step of scheduling changes the order of a plurality of requests for disk access so that they are arranged in an order of appearance when the head is moved from the current position toward one of an inner circumference and an outer circumference of the recording disk; and the step of determining the position of the data block on the recording disk is based upon, in addition to the skew, a gap such that a delay time Td(L) is always longer than a seek time Ts(L) and the difference between the delay time Td(L) and the seek time Ts(L) becomes sufficiently small in comparison with a rotation cycle, where $Td(L)=(L \cdot Bc \cdot \theta s+\theta g)/\omega$, and where, L is a seek distance in units of the number of cylinders;

Bc is a number of data blocks existing in one cylinder;

θs is a skew in units of radians;

θg is a gap in units of radians; and

ω is a rotational speed (radian/sec) of the disk.

8. A method of controlling access to a recording disk as set forth in claim 1, wherein:

the recording disk is divided into first regions for use when the head moves from the inner circumference to the outer circumference and second regions for use when the head moves from the outer circumference to the inner circumference;

the step of determining the position of the data block on the recording disk determines the position of the data block on the recording disk based on an optimum skew and a gap in the respective regions based on the direction of movement of the head; and the step of scheduling selectively accesses only the first and second regions in accordance with the direction of movement of the head.

9. A method of controlling access to a recording disk as set forth in claim 8, wherein the first regions and the second regions on the recording disk divide the disk into a plurality of at least two portions along the radial direction and both of the first regions and second regions are allocated so as to be dispersed from the innermost circumference to the outermost circumference on the disk.

10. An apparatus for controlling access to a recording disk, comprising:

a skew determining means for determining a skew so that a rotational delay time at the average distance of movement when a head accesses the recording disk is minimized;

a data block arranging means for determining the position of a data block on the recording disk based on at least the determined skew; and a scheduling means for scheduling an order of a plurality of input disk access requests so that the amount of movement of the head becomes small at the time of access of the recording disk by the head, and wherein the head accesses the recording disk based on the results of the scheduling.

11. An apparatus for controlling the access to a recording disk as set forth in claim 10, wherein the data block arranging means determines the position of the data block based upon, in addition to the skew, a gap indicating the angular difference between a start and an end of the same data block.

12. An apparatus for controlling the access to a recording disk as set forth in claim 11, wherein the data block arranging means determines combination data regarding each combination of the skew and the gap for a plurality of data blocks and selectively uses the combination data in accordance with the position of each data block on the recording disk.

13. An apparatus for controlling access to a recording disk as set forth in claim 10, wherein the data block arranging means changes the size of the data block so that the gap is constant over the entire region from the outside to the inside of the recording disk.

14. An apparatus for controlling access to a recording disk as set forth in claim 10, wherein the skew determining means determines the skew in accordance with a change of a gap of the data block based on a difference of the radius of the recording track.

15. An apparatus for controlling the access to a recording disk as set forth in claim 10, wherein:

the scheduling means changes the order of a plurality of requests for disk access so that they are arranged in an order starting from one nearest to the head when the head is moved from the current position toward one of an inner circumference and outer circumference of the recording disk; and the data block arranging means determines the position of the data block on the recording disk based upon, in addition to the skew, a gap indicating a angular difference between a start and an end of the same data block, such that a difference between a delay time Td(L) given and a seek time Ts(L) near an average seek distance La given by the following Equation (15) becomes sufficiently small in comparison with the rotation cycle, where, $$Td(L)=(L \cdot Bc \cdot \theta s+\theta g+2m\pi)/\omega \quad (14)$$

$$La=Lt/(N-1) \quad (15)$$

where,

L is a seek distance in units of the number of cylinders;

Bc is a number of data blocks existing in one cylinder;

θs is a skew in units of radians;

θg is a gap in units of radians;

ω is a rotational speed (radian/sec) of the disk;

Lt is the maximum value of the distance between access positions of the two ends when arranging the access requests in order in units of the number of cylinders;

N is the number of accesses to be simultaneously processed; and m is selected so as to become the smallest within a range where Td(L) exceeds the seek time Ts(L) at the seek distance L.

16. An apparatus for controlling the access to a recording disk as set forth in claim 10, wherein:

the scheduling means changes the order of a plurality of requests for disk access so that they are arranged in the order of appearance when the head is moved from the current position toward one of an inner circumference and an outer circumference of the recording disk and the data block arranging means determines the position of the data block on the recording disk based upon, in addition to the skew, a gap such that a delay time Td(L) given by the following Equation (16) is always longer than the seek time Ts(L) and the difference between the delay time Td(L) and the seek time Ts(L) becomes sufficiently small in comparison with the rotation cycle, where $$Td(L)=(L \cdot Bc \cdot \theta s+\theta g)/\omega, \text{ and}$$

where,

L is a seek distance in units of the number of cylinders;

Bc is a number of data blocks existing in one cylinder;

θs is a skew in units of radians;

θg is a gap in units of radians; and

ω is a rotational speed (radian/sec) of the disk.

17. An apparatus for controlling access to a recording disk as set forth in claim 10, wherein:

the recording disk is divided into first regions for use when the head moves from the inner circumference to the outer circumference and second regions for use when the head moves from the outer circumference to the inner circumference;

the data block arranging means determines the position of the data block on the recording disk based on an optimum skew and upon a gap in the respective regions based on the direction of movement of the head; and the scheduling means selectively accesses only the first and second regions in accordance with the direction of movement of the head.

18. An apparatus for controlling access to a recording disk as set forth in claim 17, wherein the first regions and the second regions on the recording disk divide the disk into a plurality of at least two portions along the radial direction and both of the first regions and second regions are allocated so as to be dispersed from the innermost circumference to the outermost circumference on the disk.

19. A method for controlling access to a disk, comprising the steps of:

determining a position of a data block on the disk to minimize a rotational delay time at an average distance of movement each time the disk is accessed by a head;

scheduling an order of a plurality of disk access requests to minimize an amount of movement of the head when the disk is accessed by the head; and accessing the disk by the head based on the result of the scheduling.

20. The method of claim 19, wherein said step of determining a position further comprises the steps of:

determining a skew so that the rotational delay time at the average distance of movement minimizes at the time of access of the disk by the head; and determining the position of the data block on the disk based on at least the determined skew, wherein said skew indicates an angular difference in a circumferential direction between the start of adjoining blocks.

21. The method of claim 20, wherein said step of determining determines the position of the data block on the disk based upon, in addition to the skew, a gap, said gap indicating an angular difference between a start and an end in the same data block.

22. An apparatus for controlling access to a disk, comprising of:

means for determining a position of a data block on the disk to minimize a rotational delay time at an average distance of movement each time the disk is accessed by a head;

means for scheduling an order of a plurality of disk access requests to minimize an amount of movement of the head when the disk is accessed by the head; and means for accessing the disk by the head based on the result of the scheduling.

23. The apparatus of claim 22, wherein said means for determining a position further comprises:

means for determining a skew so that the rotational delay time at the average distance of movement minimizes at the time of access of the disk by the head; and means for determining the position of the data block on the disk based on at least the determined skew, wherein said skew indicates an angular difference in a circumferential direction between the start of adjoining blocks.

24. The apparatus of claim 23, wherein said means for determining determines the position of the data block on the disk based upon, in addition to the skew, a gap, said gap indicating an angular difference between a start and an end in the same data block.

25. An apparatus for controlling access to a recording disk, comprising:

a skew determining means for determining a skew so that a rotational delay time at the average distance of movement when a head accesses the recording disk is minimized;

a block allocator for determining the position of a data block on the recording disk based on at least the determined skew; and a scheduler for scheduling an order of a plurality of input disk access requests so that the amount of movement of the head becomes small at the time of access of the recording disk by the head, and wherein the head accesses the recording disk based on the results of the scheduling.

26. An apparatus for controlling the access to a recording disk as set forth in claim 25, wherein the block allocator determines the position of the data block based upon, in addition to the skew, a gap indicating the angular difference between a start and an end of the same data block.

27. An apparatus for controlling the access to a recording disk as set forth in claim 26, wherein the block allocator determines combination data regarding each combination of the skew and the gap for a plurality of data blocks and selectively uses the combination data in accordance with the position of each data block on the recording disk.

28. An apparatus for controlling access to a recording disk as set forth in claim 25, wherein the block allocator changes the size of the data block so that the gap is constant over the entire region from the outside to the inside of the recording disk.

29. An apparatus for controlling access to a recording disk as set forth in claim 25, wherein the skew determining means determines the skew in accordance with a change of a gap of the data block based on a difference of the radius of the recording track.

30. An apparatus for controlling the access to a recording disk as set forth in claim 25, wherein:

the scheduler changes the order of a plurality of requests for disk access so that they are arranged in an order starting from one nearest to the head when the head is moved from the current position toward one of an inner circumference and outer circumference of the recording disk; and the block allocator determines the position of the data block on the recording disk based upon, in addition to the skew, a gap indicating a angular difference between a start and an end of the same data block, such that a difference between a delay time Td(L) given and a seek time Ts(L) near an average seek distance La given by the following Equation (15) becomes sufficiently small in comparison with the rotation cycle, where, $$Td(L)=(L \cdot Bc \cdot \theta s+\theta g+2m\pi)/\omega \qquad (14)$$

$$La=Lt/(N-1) \qquad (15)$$

where,

L is a seek distance in units of the number of cylinders;

Bc is a number of data blocks existing in one cylinder;

θs is a skew in units of radians;

θg is a gap in units of radians;

ω is a rotational speed (radian/sec) of the disk;

Lt is the maximum value of the distance between access positions of the two ends when arranging the access requests in order in units of the number of cylinders;

N is the number of accesses to be simultaneously processed; and m is selected so as to become the smallest within a range where Td(L) exceeds the seek time Ts(L) at the seek distance L.

31. An apparatus for controlling the access to a recording disk as set forth in claim 25, wherein:

the scheduler changes the order of a plurality of requests for disk access so that they are arranged in the order of appearance when the head is moved from the current position toward one of an inner circumference and an outer circumference of the recording disk and the block allocator determines the position of the data block on the recording disk based upon, in addition to the skew, a gap such that a delay time Td(L) given the following Equation (16) is always longer than the seek time Ts(L) and the difference between the delay time Td(L) and the seek time Ts(L) becomes sufficiently small in comparison with the rotation cycle, where $$Td(L)=(L \cdot Bc \cdot \theta s + \theta g)/\omega, \text{ and}$$

where,

L is a seek distance in units of the number of cylinders;

Bc is a number of data blocks existing in one cylinder;

θs is a skew in units of radians;

θg is a gap in units of radians; and

ω is a rotational speed (radian/sec) of the disk.

32. An apparatus for controlling access to a recording disk as set forth in claim 25, wherein:

the recording disk is divided into first regions for use when the head moves from the inner circumference to the outer circumference and second regions for use when the head moves from the outer circumference to the inner circumference;

the block allocator determines the position of the data block on the recording disk based on an optimum skew and upon a gap in the respective regions based on the direction of movement of the head; and the scheduler selectively accesses only the first and second regions in accordance with the direction of movement of the head.

33. An apparatus for controlling access to a recording disk as set forth in claim 32, wherein the first regions and the second regions on the recording disk divide the disk into a plurality of at least two portions along the radial direction and both of the first regions and second regions are allocated so as to be dispersed from the innermost circumference to the outermost circumference on the disk.

* * * * *

UNITED STATES PATENT AND TRADEMARK OFFICE
CERTIFICATE OF CORRECTION

PATENT NO.: 5,708,632
DATED: January 13, 1998
INVENTOR(S): TAKASHI TOTSUKA ET AL.

It is certified that error appears in the above-identified patent and that said Letters Patent is hereby corrected as shown below:

In Col. 23, line 23, after "given" insert --by--

Signed and Sealed this

Eleventh Day of August 1998

Attest:

BRUCE LEHMAN

Attesting Officer          Commissioner of Patents and Trademarks